US009791842B2

(12) United States Patent
Steffes et al.

(10) Patent No.: US 9,791,842 B2
(45) Date of Patent: Oct. 17, 2017

(54) ELECTRICAL APPLIANCE ENERGY CONSUMPTION CONTROL

(71) Applicant: Steffes Corporation, Dickinson, ND (US)

(72) Inventors: Paul J. Steffes, Dickinson, ND (US); Thomas P. Steffes, Dickinson, ND (US)

(73) Assignee: Steffes Corporation, Dickinson, ND (US)

( * ) Notice: Subject to any disclaimer, the term of this patent is extended or adjusted under 35 U.S.C. 154(b) by 0 days.

(21) Appl. No.: 15/292,517

(22) Filed: Oct. 13, 2016

(65) Prior Publication Data
US 2017/0097620 A1 Apr. 6, 2017

Related U.S. Application Data

(63) Continuation of application No. 14/695,150, filed on Apr. 24, 2015, now Pat. No. 9,478,988, which is a continuation of application No. 14/316,938, filed on Jun. 27, 2014, now Pat. No. 9,037,308, which is a continuation of application No. 12/562,474, filed on Sep. 18, 2009, now Pat. No. 8,805,597.

(60) Provisional application No. 61/151,264, filed on Feb. 10, 2009, provisional application No. 61/155,690, filed on Feb. 26, 2009.

(51) Int. Cl.
*G05D 3/12* (2006.01)
*G05B 15/02* (2006.01)

(52) U.S. Cl.
CPC .................................. *G05B 15/02* (2013.01)

(58) Field of Classification Search
CPC ... B60W 10/26; Y02T 10/7005; Y02T 10/7044; B60L 11/1861; H01M 10/44; Y10T 307/406; Y10T 307/625; H02J 2007/005
See application file for complete search history.

(56) References Cited

U.S. PATENT DOCUMENTS

| 4,449,178 | A | * | 5/1984 | Blau, Jr. | ............ | G05D 23/1923 |
| | | | | | | 219/492 |
| 5,498,490 | A | * | 3/1996 | Brodd | .................... | H01M 4/668 |
| | | | | | | 429/149 |
| 6,150,795 | A | * | 11/2000 | Kutkut | .................. | H02J 7/0018 |
| | | | | | | 320/118 |
| 6,194,867 | B1 | * | 2/2001 | Cummings | ........... | H02J 7/0013 |
| | | | | | | 320/119 |
| 6,452,363 | B1 | * | 9/2002 | Jabaji | .................... | H02J 7/0016 |
| | | | | | | 320/122 |

(Continued)

*Primary Examiner* — Darrin Dunn
(74) *Attorney, Agent, or Firm* — Brian D. Kaul; Westman, Champlin & Koehler, P.A.

(57) ABSTRACT

A power control system includes at least one energy storage device each having a heat storage medium, a heater configured to heat the heat storage medium, a temperature sensor, a maximum temperature operating parameter of the device, a user-adjustable target temperature setting, which indicates a desired temperature of the heat storage medium and is less than the maximum temperature, and a controller that controls electrical energy consumption of each of the at least one energy storage device to heat the heat storage medium to a temperature that exceeds the target temperature setting and is below the maximum temperature.

12 Claims, 5 Drawing Sheets

(56) References Cited

U.S. PATENT DOCUMENTS

| | | | | |
|---|---|---|---|---|
| 6,697,951 | B1* | 2/2004 | Sinha | G06Q 50/06 |
| | | | | 700/286 |
| 7,253,586 | B2* | 8/2007 | Kangas | H02J 7/0073 |
| | | | | 320/124 |
| 7,489,106 | B1* | 2/2009 | Tikhonov | H02J 7/0018 |
| | | | | 320/116 |
| 7,663,344 | B2* | 2/2010 | Le Gall | H02J 7/0013 |
| | | | | 320/134 |
| 7,702,424 | B2* | 4/2010 | Cannon | H04L 12/10 |
| | | | | 340/539.1 |
| 7,755,325 | B2* | 7/2010 | Taurand | H02J 7/0018 |
| | | | | 320/103 |
| 8,063,607 | B2* | 11/2011 | Crawford | F21L 4/02 |
| | | | | 320/124 |
| 9,478,988 | B2 | 10/2016 | Steffes et al. | |
| 2002/0190692 | A1* | 12/2002 | Marten | G06F 1/3203 |
| | | | | 320/116 |
| 2006/0176023 | A1* | 8/2006 | Patino | H02J 7/0013 |
| | | | | 320/132 |
| 2009/0105888 | A1* | 4/2009 | Flohr | G06Q 30/00 |
| | | | | 700/295 |
| 2009/0293816 | A1* | 12/2009 | Patterson | F24D 19/1051 |
| | | | | 122/14.22 |
| 2010/0004790 | A1* | 1/2010 | Harbin, III | F24D 19/1051 |
| | | | | 700/291 |
| 2010/0116224 | A1* | 5/2010 | Leeland | F24H 9/2035 |
| | | | | 122/14.21 |

\* cited by examiner

ELECTRICAL APPLIANCE ENERGY CONSUMPTION CONTROL

CROSS-REFERENCE TO RELATED APPLICATIONS

The present application is a continuation of U.S. patent application Ser. No. 14/695,150, filed Apr. 24, 2015, which is a continuation of U.S. patent application Ser. No. 14/316,938, filed Jun. 27, 2014; now U.S. Pat. No. 9,037,308, issued May 19, 2015, which is a continuation of U.S. patent application Ser. No. 12/562,474, filed Sep.18, 2009; now U.S. Pat. No. 8,805,597, issued Aug. 12, 2014, which is based on and claims the benefit of U.S. provisional patent application Serial No. 61/151,264, filed Feb. 10, 2009 and U.S. provisional patent application Serial No. 61/155,690, filed Feb. 26, 2009. The above -referenced applications are hereby incorporated by reference in their entirety.

BACKGROUND

Embodiments of the present invention are generally directed to controlling the power consumption and energy storage rates of an electrical appliance, and more particularly, to a way of controlling said rates responsive to a communication from an electrical power distribution system, such as an electrical power grid.

For some electrical power distribution systems, balancing power generation with energy demands (i.e., load) can be challenging, particularly when the electrical power distribution systems are connected to electrical power generating systems having a variable power output, such as wind power generators and solar power generators. For instance, wind power generators generate electrical energy outputs that vary widely depending on the wind speeds. Additionally, the power generated by such systems cannot be easily controlled by adding or removing wind turbines responsive to the energy load on the system.

As a result, variable output power generators, often generate electrical energy that, exceeds the demand on the electrical power distribution systems, such as during high wind conditions at off peak demand times. Such excess energy may be wasted if the load on the electrical power distribution system is not adjusted.

Embodiments described herein provide solutions to these and other problems, and offer other advantages over the prior art.

SUMMARY

Embodiments of the invention are generally directed to electrical appliance energy consumption control. One embodiment is directed to an electrical appliance that is configured to receive power and a power consumption signal from an electrical power distribution system. The appliance includes an energy storage device and a controller. The energy storage device includes a heat storage medium and a heater. The heater is configured to heat the heat storage medium at a heating rate. The controller adjusts the heating rate based on the power consumption signal.

Another embodiment of the invention is directed to a power control system configured to receive power and a power consumption signal from an electrical power distribution system. The system includes a plurality of electrical appliances and a controller. Each of the electrical appliances includes an energy storage device comprising a heat storage medium, a heater, and a temperature sensor. The heater is configured to heat the storage medium at a heating rate. The temperature sensor produces a temperature signal that is indicative of a temperature of the heat storage medium. The controller sets the heating rate of each energy storage device based on the power consumption signal and the temperature signal corresponding to the device.

Yet another embodiment of the invention is directed to a method of controlling the consumption of power from an electrical power distribution system by one or more energy storage devices. In the method, one or more energy storage devices are provided. Each of the energy storage devices includes a heat storage medium and a heater that is configured to heat the heat storage medium at a heating rate. A controller is also provided. A power consumption signal is received from the electrical power distribution system using the controller. The heating rate is then adjusted for each of the one or more energy storage devices based on the power consumption signal using the controller. Other features and benefits that characterize embodiments of the present disclosure will be apparent upon reading the following detailed description and review of the associated drawings.

DETAILED DESCRIPTION OF ILLUSTRATIVE EMBODIMENTS

Figure 1:
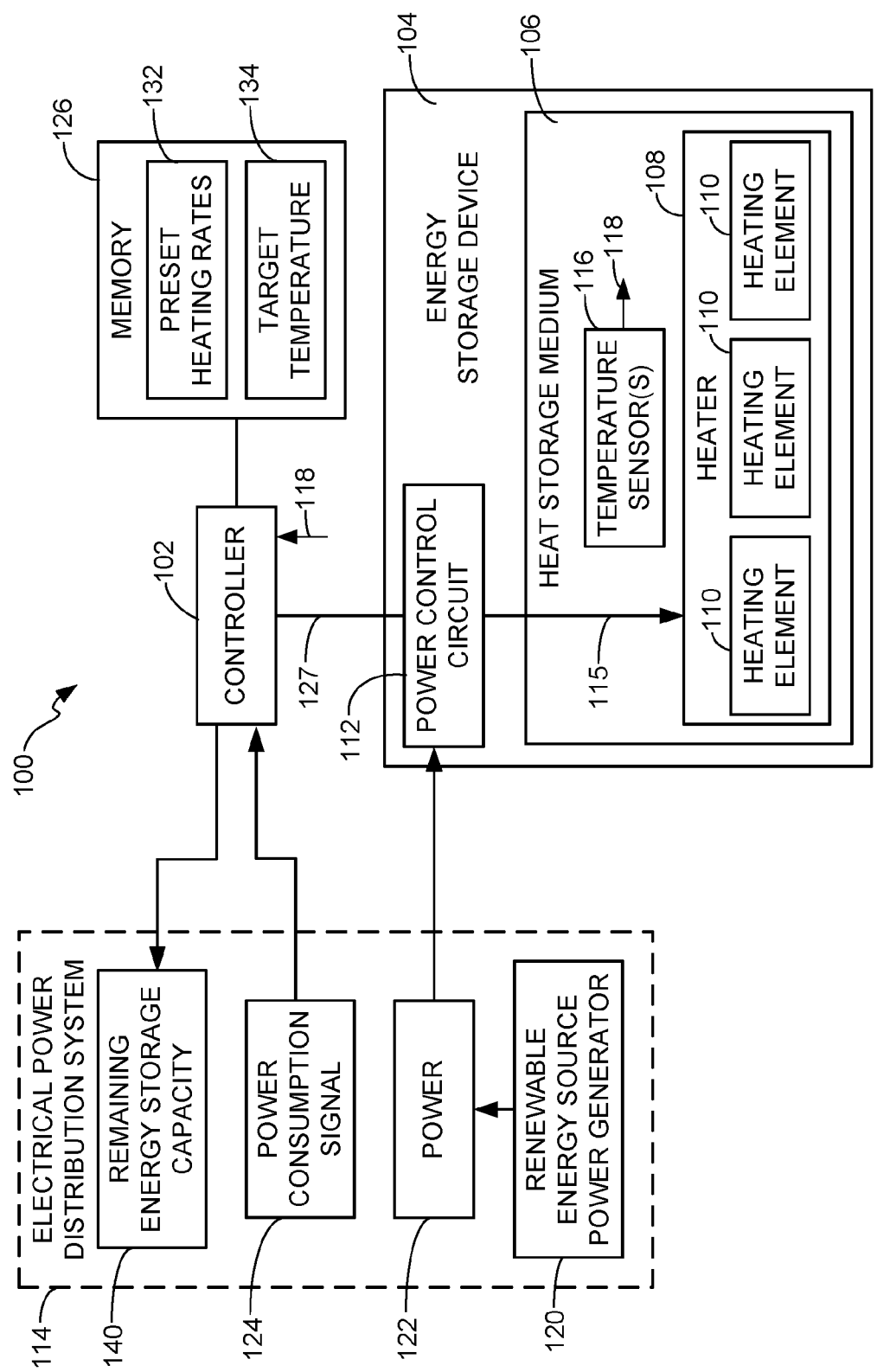
FIG. 1 is a simplified diagram of an electrical appliance in accordance with embodiments of the invention.

Embodiments of the invention are directed to an electrical appliance 100, such as that illustrated schematically in FIG. 1. The appliance 100 generally comprises a controller 102 and an energy storage device 104. One embodiment of the energy storage device 104 includes a heat storage medium 106 and a heater 108 that is configured to heat the storage medium 106.

Embodiments of the heat storage medium include liquid and solid mediums. Exemplary liquid heat storage mediums 106 include water, oil and other conventional liquid heat storage mediums. In one embodiment, heat storage medium is water and the energy storage device 104 is in the form of a water heater. Exemplary solid heat storage mediums 106 include ceramic bricks, rocks, and other conventional solid heat storage mediums. In one exemplary embodiment, the energy storage device 104 is in the form of a space heater utilizing a solid heat storage medium 106, such as ceramic bricks.

Embodiments of the heater 108 include one or more heating elements 110 that are configured to heat the medium 106. The heating elements 110 may be located within or adjacent to the heat storage medium 106. The heating elements 110 can take on any conventional form that is suited to heating the medium 106. Exemplary heating elements 110 include resistive heating elements, such as heating coils, and other electrical heating elements.

One embodiment of the energy storage device 104 includes a power control circuit 112, which receives power from an electrical power distribution system 114. The power control circuit 112 uses the received power to output a power supply signal 115 that powers the heater 108. In one embodiment, the power supply signal 115 is controlled by the controller 102. In one embodiment, the heating rate, at which the heater 108 heats the medium 106, is dependent upon the power supply signal 115. That is, supplying more power to the heater 108 and, more particularly, the one or more heating elements 110, results in a higher heating rate than when less power is supplied to the heater 108.

In one embodiment, the energy storage device 104 includes one or more temperature sensors 116 that are configured to sense the temperature of the heat storage medium 106 and produce an output signal 118 that is indicative of the temperature of the heat storage medium 106. The one or more temperature output signals 118 are received by the controller 102.

The electrical power distribution system 114 can be in the form of an electrical power grid or other off-grid system that includes a renewable energy source power generator 120. The renewable energy source power generator 120 generates at least a portion of the power 122, which is distributed by the electrical power distribution system 114, from a renewable energy source, such as wind, sunlight, rain, tides, water, geothermal heat or other renewable energy source.

The energy generated by at least some of these renewable energy sources can vary wildly throughout a given day. For instance, the amount of energy generated by wind turbines fluctuates with the wind conditions. Additionally, the demand for energy from the electrical power distribution system 114 varies throughout a day. At times, the amount of energy generated by the power generator 120 exceeds the demand for power, such as at night. Under such circumstances, energy generated by the generator 120 is wasted.

The power 122 is supplied to one or more of the appliances 100 and is used by the power control circuit 112 to produce the power supply signal 115. The heating of the medium 106 responsive to the power supply signal 115 constitutes a transformation of the electrical energy into heat energy. Thus, a portion of the electrical power generated by the power generator 120 is stored as heat energy in the medium 106. This stored energy can be consumed at a later time through the use of the heated medium 106.

Embodiments of the invention relate to the controlled heating of the heat storage medium 106 responsive to a power consumption signal 124 from the electrical power distribution system 114. One embodiment of the power consumption signal 124 is indicative of a desire for energy to be consumed or not by the one or more appliances 100 receiving power 122 from the electrical power distribution system 114. The power consumption signal 124 may be an analog or digital signal that is communicated to the controller over a physical communication link (wire, optical cable, etc.) or wireless communication link (radio frequency, wireless network, etc.) in accordance with conventional communication methods.

In one embodiment, the power consumption signal 124 is indicative of a rate at which the electrical power distribution system 114 desires that energy be consumed. For instance, when the load on the system 114 is low relative to the energy being generated by the renewable energy source power generator 120, the power consumption signal 124 may indicate a desire for energy to be consumed by the one or more appliances 100. The energy consumption signal 124 may also indicate a desire for energy to be consumed even when excess energy is not available, such as during off peak periods when the system 114 can sustain a higher level of energy consumption. Additional embodiments of the power consumption signal 124 will be described below.

One embodiment of the controller 102 includes one or more processors, such as microprocessors, that are configured to execute program instructions stored in a memory 126, such as a tangible computer storage medium (e.g., RAM, ROM, flash memory, etc.) to perform embodiments of the invention described below. The controller 102 may comprise one or more controllers that are remote from and/or components of the energy storage device 104.

In one embodiment, the controller 102 is configured to receive the power consumption signal and adjust the heating rate at which the heater 108 heats the medium 106 responsive to the power consumption signal 124. The term "heating rate" as used herein corresponds to the amount of energy that is supplied to the heater 108 of the appliance 100. That is, an increase in the heating rate means that there is an increase in the amount of electrical power that is supplied to the heater 108, and a decrease in the heating rate means that there is a decrease in the amount of electrical power that is supplied to the heater 108.

The heating rate adjustment can be accomplished in many different ways. In one embodiment, the controller 102 communicates a power setting signal 127 to the power control circuit 112 and/or the heater 108, which controls the heating rate of the heater 108. The power setting signal 127 may be communicated over a network, through a physical communication link, through a wireless communication link, or using another suitable conventional data communication technique.

In one embodiment, the controller 102 adjusts the power supplied to the heater 108 by the power control circuit 112 responsive to the power consumption signal 124. In one embodiment, the controller 102 adjusts the duty cycle of the power signal 115 provided to the heater 108 from the power control circuit 112 responsive to the power consumption signal 124. Thus, the controller 102 may increase the duty cycle of the power signal 115 resulting in greater power consumption by the heater 108 when the power consumption signal 124 indicates a desire for an increase in consumption of the power 122 distributed by the system 114. This results in an increase in the heating rate at which the heater 108 heats the medium 106. Likewise, the controller 102 may decrease the duty cycle of the power signal 115 reducing power consumption by the heater 108 when the power consumption signal 124 indicates a desire for a decrease in consumption of the power 122 distributed by the system 114. This results in a decrease in the heating rate at which the heater 108 heats the medium 106.

In accordance with another embodiment, the controller 102 adjusts the heating rate at which the heater 108 heats the medium 106 by selectively activating or deactivating the heating elements 110. The heating rate is increased by activating one or more additional heating elements 110 and the heating rate is decreased by deactivating one or more heating elements.

In accordance with one embodiment, the heating rate of the heater 108 is adjusted using a combination of an adjustment to the duty cycle of the power signal 115 and the activation or deactivation of one or more of the heating elements 110.

In one embodiment, the power consumption signal 124 comprises a value within a range of values, such as, 0-5, 0-100, or other suitable range, which indicates the desirability for energy consumption by the appliance 100. For instance, a power consumption signal representing one end of the range of values, such as 0, may be output from the electrical power distribution system 114 when the system 114 is under high load and/or little energy is being generated by the generator 120 to indicate a strong desire that little to no energy be consumed by the appliance 100, while a power consumption signal 124 representing the other end of the range of values, such as 100, may be output from the system 114 when the system 114 is under a low load and/or a large amount of energy is being generated by the generator 120 to indicate a strong desire for energy to be consumed by the appliance 100. Values between the extremes of the range of values, such as between 0 and 100, can be used to indicate energy consumption desires that are proportional to their relationship to the extremes of the range of values represented by the power consumption signal 124.

Figure 2:
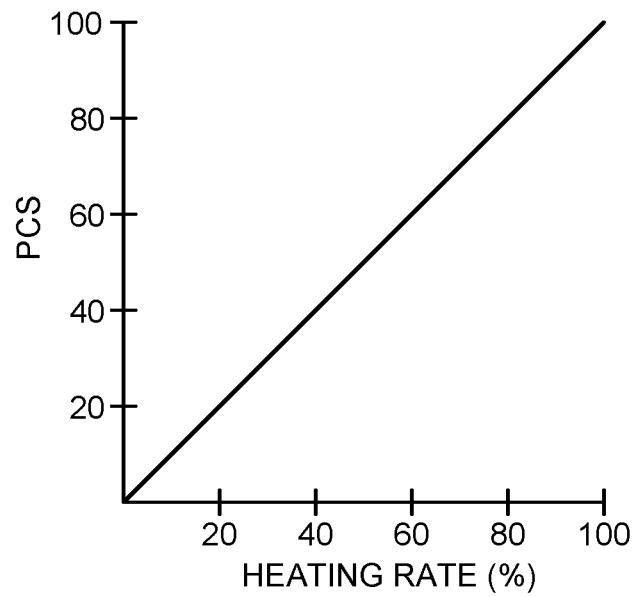
FIGS. 2 and 3 are charts illustrating an example of heating rate settings corresponding to a power consumption signal from an electrical power distribution system, in accordance with embodiments of the invention.

In one embodiment, the controller 102 adjusts the heating rate of the heater 108 responsive to the value represented by the energy consumption signal 124. The heating rate adjustment can be a direct setting of the heating rate to a percentage of the maximum heating rate of the heater 108 responsive to the value represented by the energy consumption signal 124, or a delta increase or decrease responsive to the value represented by the energy consumption signal 124. FIG. 2 is a chart illustrating an example of the heating rate (i.e., percentage of the maximum heating rate) of the heater 108 that is set by the controller 102 responsive to the value (0-100) represented by the power consumption signal (PCS) 124. In FIG. 2, the value 0 indicates a low desire for energy consumption and the heater 108 is deactivated by the controller by setting the heating rate to 0% (as shown). In another embodiment, the controller 102 does not increase the heating rate of the heater 108 responsive to a power consumption signal 124 representing the value 0 or equivalent, and the heater 108 maintains normal operations. In one embodiment, as the value represented by the power consumption signal 124 increases, the controller 102 increases the heating rate of the heater 108. The increase in the heating rate may be linear, as shown in FIG. 2.

Figure 3:
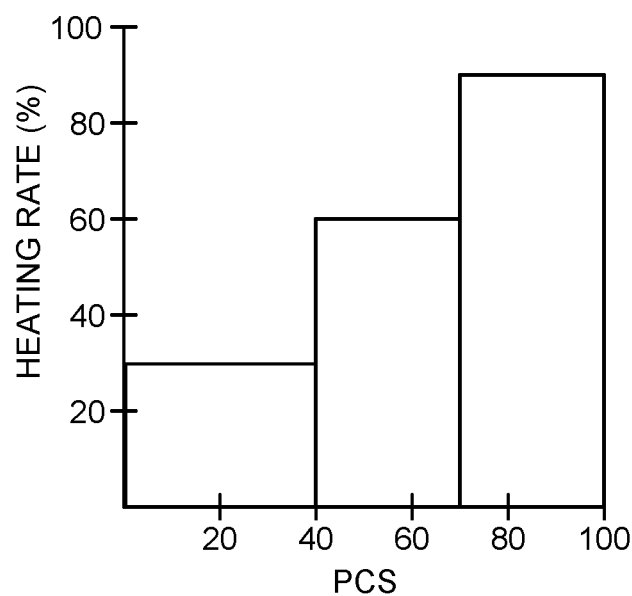

Alternatively, the controller may adjust the heating rate of the heater 108 non-linearly responsive to the value represented by the power consumption signal, an example of which is illustrated in the chart of FIG. 3. In one embodiment, certain ranges of the values represented by the power consumption signal 124 are mapped to a plurality of preset heating rates (percentage of the maximum heating rate). The controller 102 adjusts the heating rate of the heater 108 to the present heating rate that corresponds to the value represented by the power consumption signal 124. In one embodiment, the mapping of the preset heating rates is stored in the memory 126, as indicated at 132 in FIG. 1. The controller compares the value represented by the power consumption signal 124 to the mapping 132 to extract the corresponding heating rate and sets the heating rate of the heater 108 accordingly. For instance, the preset heating rates 132 may include a deactivated state when the value represented by the signal 124 is in the range of 0-10, a setting of 30% of the maximum heating rate when the value represented by the signal 124 is in the range of 10-40, a setting of 60% of the maximum heating rate when the value represented by the signal 124 is in the range of 40-70, and a setting of 90% of the maximum heating rate when the value represented by the signal 124 is in the range of 70-100. It is understood that the example of FIG. 3 is merely for illustration purposes and that more or less preset heating rates 132 may be used.

One embodiment of the appliance 100 includes a target temperature setting, which indicates the desired temperature of the heat storage medium 106. In one embodiment, the target temperature is accessible by the controller 102. In one embodiment, the memory 126 includes the target temperature setting, as indicated at 134. In one embodiment, the target temperature is set by the user of the appliance 100. In one embodiment, the controller 102 adjusts the heating rate of the heater 108 responsive to the target temperature, the temperature signal 118 output from the one or more sensors 116, and the power consumption signal 124. In accordance with one embodiment, when the power consumption signal 124 indicates that it is desirable for the appliance 100 to consume energy, and the temperature signal 118 indicates that the temperature of the heat storage medium 106 is less than the target temperature, the controller 102 increases the heating rate of the heater 108.

In one embodiment, a heat deficit is defined as the difference between the temperature of the heat storage medium 106 and the target temperature. Such a heat deficit is indicative of an amount of energy that a user desires to consume with the appliance 100. In one embodiment, the controller 102 adjusts the heating rate of the heater 108 based on a combination of the power consumption signal 124 and the heat deficit of the energy storage device 104. In one embodiment, the controller 102 increases or decreases the heating rate of the heater 108 responsive to the power consumption signal in accordance with the embodiments described above. Additionally, the increase or decrease of the heating rate is weighted by the heat deficit. That is, when the heat deficit is large, the controller will further increase (i.e., boost) the heating rate when the power consumption signal 124 indicates a desire for energy to be consumed by the appliance 100. When there is a zero heat deficit, a small heat deficit or a negative heat deficit (i.e. temperature of the medium exceeds the target temperature), the controller 102 does not provide this additional boost to the heating rate.

Figure 4:
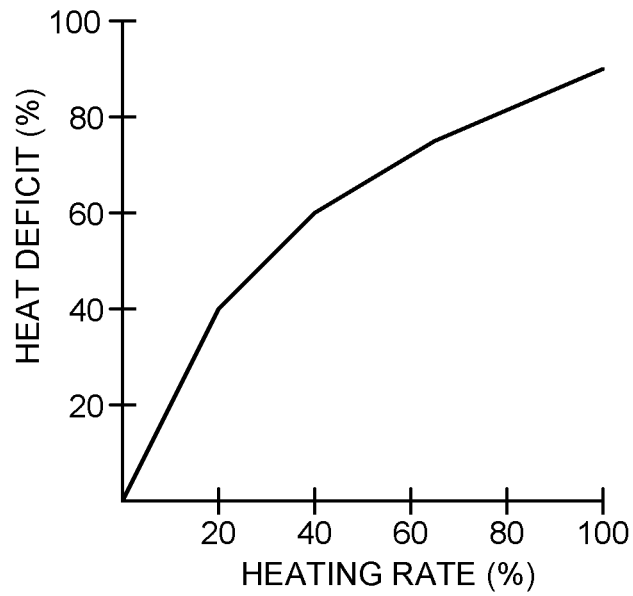
FIG. 4 is a chart illustrating exemplary heating rate settings corresponding to a heat deficit of a heat storage medium, in accordance with embodiments of the invention.

FIG. 4 is a chart illustrating an example of this heat deficit dependence of the heating rate set by the controller 102 when the power consumption signal 124 indicates a desire for energy to be consumed. As shown in FIG. 4, for a particular energy consumption signal 124, the heating rate increases responsive to an increase in the heat deficit.

The controller 102, may also operate in a similar, but opposite manner when the heat deficit is negative, by decreasing the heating rate that would otherwise have been set based on the power consumption signal 124.

In one embodiment, the controller 102 is configured to output a signal indicating a remaining energy storage capacity 140, which is indicative of the remaining energy storage capacity of the energy storage device 104, as illustrated in FIG. 1. In one embodiment, the remaining energy storage capacity 140 is indicative of the remaining amount of heat that can be stored by the heat storage medium 106. In one embodiment, the heat storage medium 106 has a maximum temperature ($T_{MAX}$), at which the energy storage device 104 can be safely operated. Thus, the "maximum temperature," as used herein, is defined by the operating parameters of the energy storage device 104. For example, water heaters typically have a maximum temperature of 170 degrees. Thus, the remaining energy storage capacity 140 of each energy storage device 104 is directly related to the difference between the current temperature of the heat storage medium 106 and the maximum temperature of the heat storage medium 106. The maximum temperature of the heat storage medium 106 may be stored in the memory 126 for access by the controller 102. The current temperature of the heat storage medium 106 can be provided to the controller 102 by the one or more temperature sensors 116 via the output signal 118.

In one embodiment, the controller 152 allows the temperature of the heat storage mediums 106 of the energy storage devices 104 to exceed the target temperature for the device 104 in order to store additional energy when the energy storage capacity of the device 104 has not been reached. This is particularly useful when there is an abundance of excess power 122 that is available for distribution by the system 114. In one embodiment, the controller 102 adjusts the heating rate of the heater 108 of the device 104 based on the remaining heat capacity for the device 104 and the energy consumption signal 124.

In one embodiment, the electrical power distribution system 114 adjusts the power consumption signal 124 responsive to the remaining energy storage capacity 140 output from the controller 102.

Figure 5:
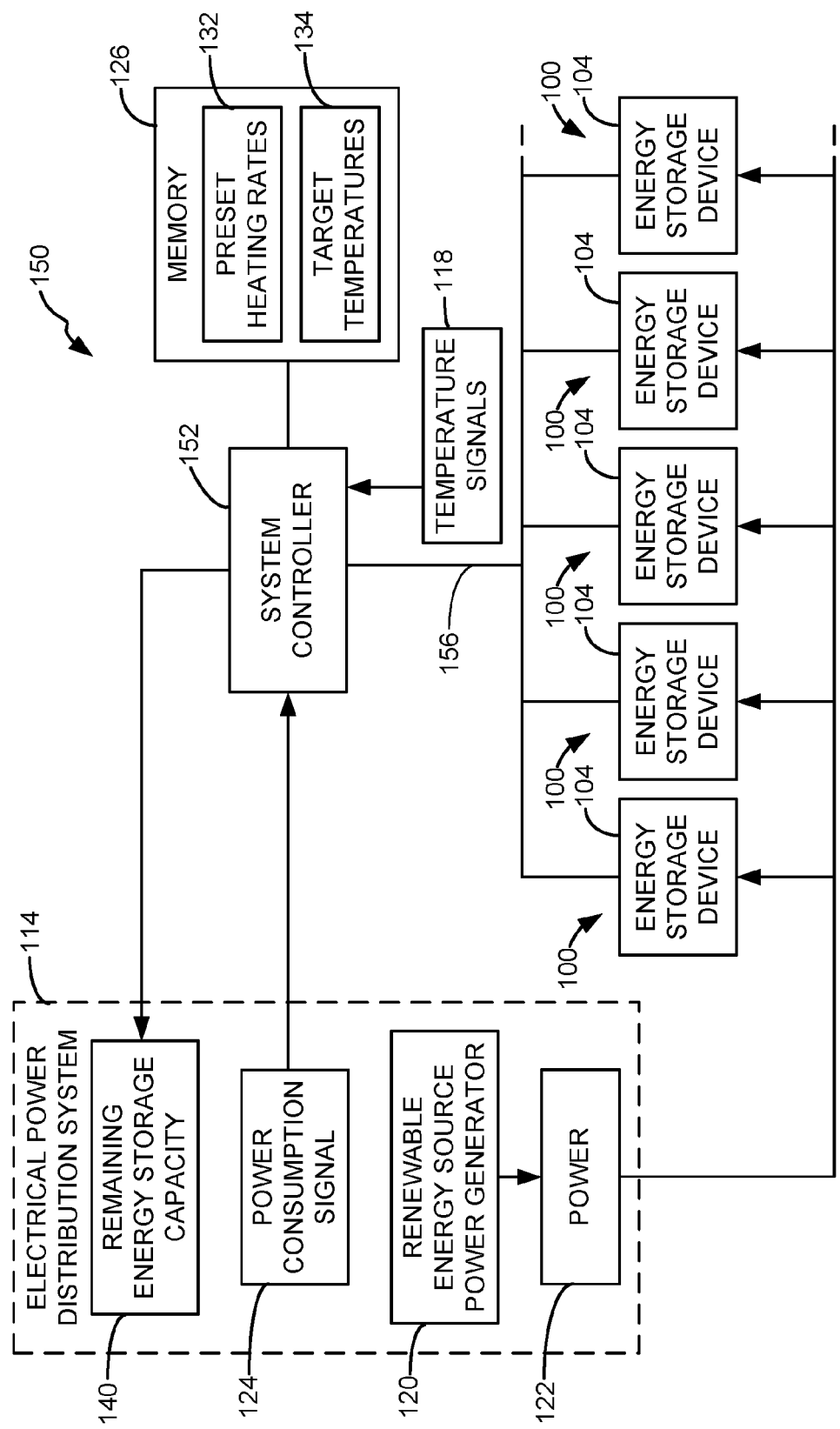
FIG. 5 is a simplified block diagram of a power control system in accordance with embodiments of the invention.

Another embodiment of the invention is directed to a power control system 150, a simplified diagram of which is provided in FIG. 5. The system 150 includes a system controller 152 and a plurality of electrical appliances 100, each comprising an energy storage device 104, in accordance with the embodiments described above with reference to FIG. 1. While only five appliances 100 are shown, it is understood that the system 150 may include more or fewer appliances 100 than that shown.

In one embodiment, each of the appliances 100 of the system 150 comprise an energy storage device 104 comprising a heat storage medium 106 and a heater 108 configured to heat the heat storage medium 106 at a heating rate, as described above. In one embodiment, the appliances 100 each include one or more temperature sensors 116 having a temperature signal 118 that is indicative of a temperature of the heat storage medium 106.

The system 150 receives power 122 and the power consumption signal 124 from the electrical power distribution system 114, embodiments of which are described above. In one embodiment, the power 122 is supplied to the energy storage devices 104. The power consumption signal 124 is supplied to the controller 152.

In one embodiment, the controller 152 is remote from the appliances 100. In accordance with another embodiment, the controller 152 comprises one or more controllers, such as controllers 102 of the appliances 100. The controller 152 may comprise one or more processors that are configured to execute program instructions for carrying out the functions described herein, as discussed above with regard to controller 102. One embodiment of the system 150 includes a memory 126, which may include the program instructions that are executable by the controller 152. In one embodiment, the memory 126 includes preset heating rates 132 for each of the appliances 100 in the system 150. The preset heating rates for the appliances 100 may be different from one another.

In accordance with another embodiment, the memory 126 of the system 150 includes target temperatures 134 for each of the appliances 100. As with the preset heating rates 132, the target temperatures 134 may be different for each of the appliances 100.

In one embodiment, the controller 152 sets or adjusts the heating rate of each of the energy storage devices 104 of the system 150 based on the power consumption signal 124, in accordance with the embodiments described above. The heating rates of the heaters 108 of the devices 104 can be adjusted in accordance with the embodiments described above with reference to FIG. 1.

In one embodiment, the heating rates of the heaters 108 are adjusted responsive to a power setting signal 156 communicated to the appliances 100 of the system 150 from the controller 152. As with the signal 127, the power setting signal 156 may be communicated from the system controller 152 to the appliances 100 of the system 150 over a network, through a physical communication link, through a wireless communication link, or using another suitable conventional data communication technique. The power setting signal 156 may comprise multiple signals each addressed to one of the appliances 100 of the system 150, in accordance with conventional communication protocols.

In another embodiment, the controller 152 sets the heating rate of each of the energy storage devices 104 of the system 150 based on the power consumption signal 124 and the temperature signals 118 corresponding to the mediums 106 of the energy storage devices 104. In one embodiment, the controller 152 sets higher heating rates for the energy storage devices 104 of the system 150 having lower temperature heat storage mediums 106 than the heating rates of the energy storage devices 104 having higher temperature heat storage mediums 106. In one embodiment, such heating rate adjustments are dependent on a power consumption signal 124 that indicates a desire for energy to be consumed by the appliances 100.

Figure 6:
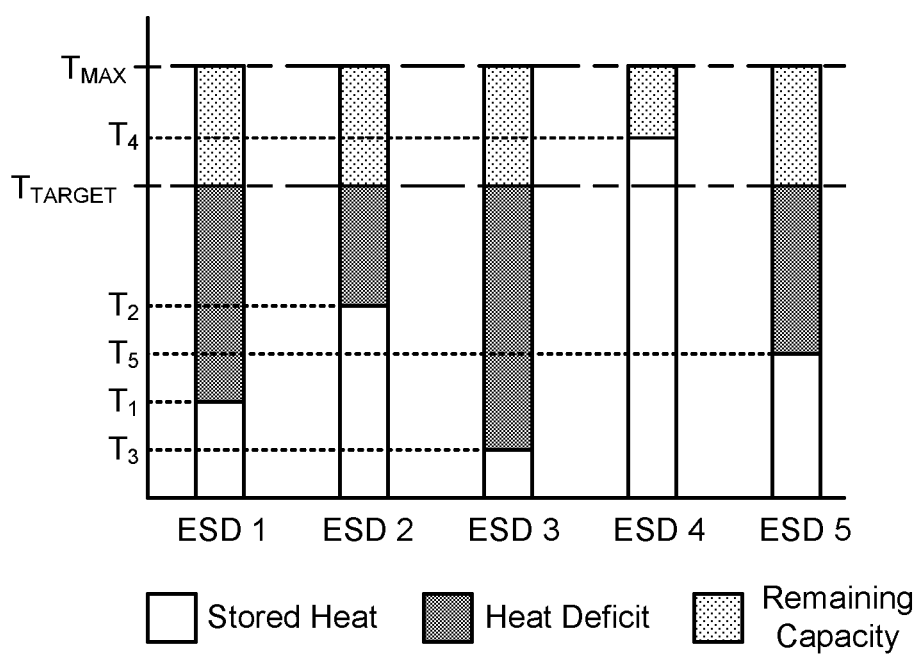
FIG. 6 is a chart illustrating exemplary temperatures of five energy storage devices of an exemplary power control system, in accordance with embodiments of the invention.

FIG. 6 is a chart illustrating the temperatures of five energy storage devices 104 of an exemplary system 150, in accordance with embodiments of the invention. In one embodiment, the controller 152 sets a higher heating rate for heaters 108 of the energy storage devices 104 having heat storage mediums 106 at a lower temperature than the heating rates of the energy storage devices 104 having heat storage mediums 106 at a higher temperature. As illustrated in FIG. 6, exemplary energy storage devices (ESD's) 1 and 3 have heat storage mediums 106 at relatively low temperatures $T_1$ and $T_3$, respectively. In one embodiment, the controller 152 adjusts the heating rate of the heaters 108 for the energy storage devices 1 and 3 to a higher heating rate than that of the heaters 108 for the energy storage devices 2, 4 and 5, because the temperature of their heat storage mediums 106 is higher than that of energy storage devices 1 and 3. In one embodiment, such heating rate adjustments are dependent on a power consumption signal 124 that indicates a desire for energy to be consumed by the appliances 100.

In accordance with one embodiment, each of the energy storage devices 104 of the system 150 comprises a target temperature 134 that is indicative of a desired temperature for the corresponding heat storage medium 106. In one embodiment of the system 150, the controller 152 sets each of the heating rates of the heaters 108 of the energy storage devices 104 based on the target temperature corresponding to the device 104. While FIG. 6 indicates that each of the energy storage devices 1-5 have the same target temperature ($T_{TARGET}$), it is understood that each of the energy storage devices 1-5 may have a different target temperature than the other devices 104.

In one embodiment, each of the energy storage devices 104 of the system 150 has a heat deficit that is based on a difference between the target temperature for the device 104 and the temperature of the heat storage medium 106 of the device 104, as indicated in FIG. 6. In one embodiment, the controller 152 sets higher heating rates for the heaters 108 of the energy storage devices 104 having higher heat deficits than the heating rates of the heaters 108 of the energy storage devices 104 having lower heat deficits. Thus, in the exemplary system illustrated by FIG. 6, the controller 152 would adjust the heating rates of the heaters 108 of the energy storage devices 1 and 3 to a higher heating rate than that of the heaters 108 of the energy storage devices 2, 4 and 5, because the heat deficits of the devices 1 and 3 are larger than those of the devices 2, 4 and 5.

In one embodiment, the controller 152 is configured to output a signal indicating a remaining energy storage capacity 140, which is indicative of the remaining energy storage capacity of the energy storage device 104, as illustrated in FIG. 5. As discussed above, the remaining energy storage capacity 140 is indicative of the remaining amount of heat that can be stored by the heat storage medium 106. In one embodiment, the controller 152 allows the temperature of the heat storage mediums 106 of the energy storage devices 104 to exceed the target temperature for the device in order to store additional energy, such as indicated by device 4 in FIG. 5. In one embodiment, the controller adjusts the heating rate of the heaters 108 of the devices 104 based on a remaining heat capacity defined as the difference between the maximum temperature ($T_{MAX}$) for each device 104 and the temperature of the heat storage medium 106 of the corresponding device 104. In one embodiment, the controller 152 sets higher heating rates for the heaters 108 of the energy storage devices 104 having higher remaining heat capacities than the heating rates of the heaters 108 of the energy storage devices 104 having lower remaining heat capacities. Thus, the heating rates of the heaters 108 of the energy storage devices 1-3 and 5 would be set higher than the heat rate for the energy storage device 4, which is has a lower remaining energy storage capacity. This is particularly useful when there is an abundance of excess power 122 that is available for distribution by the system 114 and the temperatures of one or more of the devices 104 are less than their maximum temperatures ($T_{MAX}$).

Figure 7:
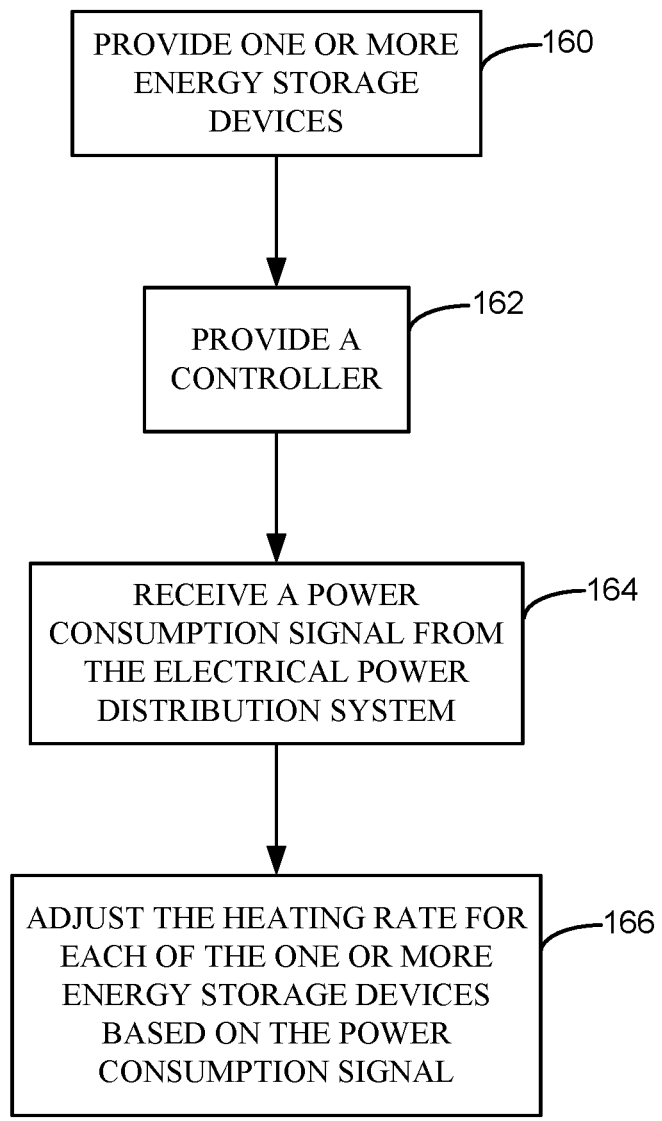
FIG. 7 is a flowchart illustrating a method of controlling the consumption of power from an electrical power distribution system by one or more energy storage devices in accordance with embodiments of the invention.

Another embodiment of the invention is directed to a method of controlling the consumption of power from electrical power distribution system 114 by one or more energy storage devices 114. FIG. 7 is a flowchart illustrating one embodiment of the method. At 160, one or more energy storage devices 104 are provided. The energy storage devices 104 are formed in accordance with the embodiments described above. In one embodiment, the energy storage devices 104 each comprise a heat storage medium 106 and a heater 108 that is configured to heat the heat storage medium 106 at a heating rate.

At step 162, a controller, such as controller 102 (FIG. 1) and/or controller 152 (FIG. 5), in accordance with the embodiments described above. At step 164, a power consumption signal 124 is received from the electrical power distribution system 114 using the controller. Next, at step 166, the heating rate for each of the one or more energy storage devices 104 is adjusted using the controller based on the power consumption signal 124, in accordance with the embodiments described above.

In accordance with one embodiment of the method, a temperature of the heat storage medium 106 of each of the one or more energy storage devices 104 is sensed. In one embodiment, the energy storage devices include one or more temperature sensors 116 that operate to sense the temperature of the heat storage medium 106 and produce a temperature output signal 118 that is indicative of the temperature of the heat storage medium 106, as discussed above with reference to FIG. 1. Next, a target temperature, such as target temperature 134, for each of the one or more energy storage devices 104 is received. The target temperature is indicative of a desired temperature of the heat storage medium 106 for the corresponding energy storage device 104. Finally, the heating rate for each of the one or more energy storage devices 104 is further adjusted using the controller based on the sensed temperature and the target temperature of the corresponding heat storage medium 106.

In accordance with another embodiment of the method, step 160 comprises providing a plurality of the energy storage devices 104. In one embodiment, a heat deficit is calculated for each of the one or more energy storage devices 104. One embodiment of the calculation involves calculating a difference between the sensed temperature and the target temperature for the heat storage medium 106 of each of the energy storage devices 104. One embodiment of step 166 comprises adjusting the heating rates of the plurality of energy storage devices 104 based on the calculated heat deficits.

Embodiments of step 166 include the heating rate adjusting techniques described above. In one embodiment, the heating rates of the heaters 108 of the one or more energy storage devices 104 are adjusted by adjusting a duty cycle of a power supply signal 115 to the heaters 108 of the one or more energy storage devices 104. In accordance with another embodiment, the heating rates for each of the one or more energy storage devices 104 are adjusted by selectively activating or deactivating one or more heating elements 110 (FIG. 1) of the heaters 108 of the one or more energy storage devices 104.

Although the present invention has been described with reference to preferred embodiments, workers skilled in the art will recognize that changes may be made in faun and detail without departing from the spirit and scope of the invention.

What is claimed is:

1. A power control system configured to receive electrical energy from an electrical power distribution system, the system comprising:
    a plurality of energy storage devices, each energy storage device comprising:
        a heat storage medium;
        a heater configured to heat the heat storage medium;
        a temperature sensor that produces a temperature signal indicative of a temperature of the heat storage medium;
        a maximum temperature operating parameter of the device; and
        a user-adjustable target temperature setting, which indicates a desired temperature of the heat storage medium and is less than the maximum temperature; and
    a controller controls electrical energy consumption of at least one of the energy storage devices to heat its heat storage medium to a temperature that exceeds the target temperature setting and is below the maximum temperature as a function of:
        on a power consumption signal received from the electrical power distribution system, indicating a desire for energy to be consumed: and
        a difference between a remaining heat capacity of the energy storage device and the remaining heat capacity of at least another of the energy storage devices.

2. The system according to claim 1, wherein the maximum temperature of each of the at least one storage device is stored in memory that is accessible by the controller.

3. The system according to claim 1, wherein the controller controls the energy storage devices having higher remaining heat capacities to consume more energy than the energy storage devices having lower remaining heat capacities.

4. The system according to claim 1, wherein:
the power consumption signal indicates a value; and
the controller controls the electrical energy consumption of the at least one energy storage device based on the value.

5. The system according to claim 1, wherein at least a portion of the electrical energy is generated using a renewable energy source.

6. A method of controlling consumption of electrical energy from an electrical power distribution system by at least one of the plurality of energy storage devices, each energy storage device including a heater that heats a heat storage medium, a user-adjustable target temperature setting, and a maximum temperature operating parameter, the method comprising:
accessing a current temperature of the heat storage medium of each energy storage device;
accessing the maximum temperature operating parameter for each energy storage device from a memory;
receiving a power consumption signal from the electrical power distribution system, the power consumption signal indicative of a desire for electrical energy to be consumed, using a controller; and
controlling the energy consumption of at least one of the energy storage devices using the controller to heat its heat storage medium to a temperature that exceeds the target temperature and is below the maximum temperature as a function of:
the power consumption signal; and
a difference between a remaining heat capacity of the energy storage device and the remaining heat capacity of at least another of the energy storage devices, wherein the remaining heat capacity of each energy storage device is different between the maximum temperature for the device and the temperature of the heat storage medium of the device.

7. The method according to claim 6, wherein accessing a current temperature comprises receiving a temperature signal from a temperature sensor.

8. The method according to claim 6, wherein accessing a current temperature comprises accessing the current temperature from memory.

9. The method according to claim 6, wherein:
the remaining heat capacity of each device is a difference between the maximum temperature for the device and the temperature of the heat storage medium of the device.

10. The method according to claim 6, wherein controlling the energy consumption of at least one of the energy storage devices comprises controlling the energy storage devices having higher remaining heat capacities to consume more energy than the energy storage devices having lower remaining heat capacities.

11. The method according to claim 6, wherein controlling the energy consumption of at least one of the energy storage devices includes controlling the energy storage device to consume electrical energy generated from a renewable energy source.

12. The method according to claim 6, wherein:
the power consumption signal indicates a value; and
controlling the energy consumption of at least one of the energy storage devices comprises controlling the energy consumption of the energy storage device based on the value.

\* \* \* \* \*